(12) United States Patent
Colson et al.

(10) Patent No.: US 10,371,156 B2
(45) Date of Patent: Aug. 6, 2019

(54) VENTILATION FAN HAVING AIR BEARING SYSTEM

(71) Applicant: HAMILTON SUNDSTRAND CORPORATION, Windsor Locks, CT (US)

(72) Inventors: Darryl A. Colson, West Suffield, CT (US); Murtuza Lokhandwalla, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 197 days.

(21) Appl. No.: 15/255,488

(22) Filed: Sep. 2, 2016

(65) Prior Publication Data
US 2018/0066666 A1 Mar. 8, 2018

(51) Int. Cl.
*F04D 25/08* (2006.01)
*F04D 25/06* (2006.01)
(Continued)

(52) U.S. Cl.
CPC ............ *F04D 25/08* (2013.01); *B64D 13/06* (2013.01); *F04D 19/002* (2013.01); *F04D 25/06* (2013.01); *F04D 25/082* (2013.01); *F04D 29/04* (2013.01); *F04D 29/043* (2013.01); *F04D 29/051* (2013.01); *F04D 29/057* (2013.01); *F04D 29/0513* (2013.01); *F04D 29/181* (2013.01); *F04D 29/325* (2013.01); *F04D 29/522* (2013.01); *F04D 29/5806* (2013.01); *F16C 17/024* (2013.01); *F16C 32/0614* (2013.01); *F16C 32/0625* (2013.01);
(Continued)

(58) Field of Classification Search
CPC .... F04D 19/002; F04D 25/06; F04D 25/0606; F04D 25/08; F04D 13/005; F04D 13/0633; F04D 13/0646; F04D 13/0653; F04D 29/04; F04D 29/041; F04D 29/043; F04D 29/046; F04D 29/181; F04D 29/325; F04D 29/057; F04D 29/0513; F04D 29/522; F04D 29/051; F16C 32/0614; F16C 32/0625
See application file for complete search history.

(56) References Cited

U.S. PATENT DOCUMENTS 4,507,939 A * 4/1985 Wieland .................. F25B 9/004
 384/453
5,113,670 A * 5/1992 McAuliffe ............ F01D 25/125
 417/406
(Continued)

OTHER PUBLICATIONS

European Search Report for European Application No. 17188731.8 dated Jan. 22, 2018, 8 pages.

*Primary Examiner* — Christopher S Bobish
(74) *Attorney, Agent, or Firm* — Cantor Colburn LLP

(57) ABSTRACT

A ventilation fan includes a shaft assembly, a rotor, a motor housing, and a bearing housing. The shaft assembly defines a first port and a second port. The rotor has a rotor first portion disposed about a first portion of the shaft assembly and a rotor second portion that extends from the rotor first portion. The rotor first portion defines a rotor port. The motor housing is disposed about a second portion of the shaft assembly. The motor housing defines a housing port. The bearing housing is operatively connected to the motor housing. The bearing housing is disposed about a third portion of the shaft assembly.

10 Claims, 4 Drawing Sheets

(51) Int. Cl.
*F04D 29/051* (2006.01)
*F04D 29/057* (2006.01)
*B64D 13/06* (2006.01)
*F04D 29/043* (2006.01)
*F04D 29/04* (2006.01)
*F04D 29/18* (2006.01)
*F04D 19/00* (2006.01)
*F04D 29/32* (2006.01)
*F16C 32/06* (2006.01)
*F04D 29/58* (2006.01)
*F04D 29/52* (2006.01)
*F16C 17/02* (2006.01)
*H02K 5/167* (2006.01)
*H02K 7/14* (2006.01)
*H02K 9/06* (2006.01)

(52) U.S. Cl.
CPC ............ *H02K 5/1672* (2013.01); *H02K 7/14* (2013.01); *B64D 2013/0603* (2013.01); *F16C 2326/43* (2013.01); *F16C 2360/46* (2013.01); *H02K 9/06* (2013.01)

(56) References Cited

U.S. PATENT DOCUMENTS

| | | | | |
|---|---|---|---|---|
| 6,151,909 A * | 11/2000 | Carter | ............... | B64D 13/08 62/402 |
| 7,342,332 B2 * | 3/2008 | McAuliffe | ............ | H02K 7/083 310/58 |
| 7,394,175 B2 * | 7/2008 | McAuliffe | .............. | H02K 1/20 310/58 |
| 7,402,020 B2 * | 7/2008 | Beers | .................... | F04D 25/04 415/1 |
| 7,757,502 B2 * | 7/2010 | Merritt | .................. | B64D 13/06 417/405 |
| 8,418,495 B2 * | 4/2013 | Merritt | .................. | B64D 13/06 415/216.1 |
| 8,459,966 B2 * | 6/2013 | Hipsky | ................. | B64D 13/00 417/325 |
| 8,529,192 B2 * | 9/2013 | Beers | .................... | F04D 29/051 415/107 |
| 8,622,620 B2 * | 1/2014 | Beers | .................... | F04D 25/082 384/115 |
| 8,672,768 B2 * | 3/2014 | Colson | .................... | H02K 7/14 123/41.65 |
| 8,734,017 B1 * | 5/2014 | Colson | ................. | F01D 25/186 384/107 |
| 8,784,048 B2 * | 7/2014 | Beers | .................... | F04D 19/002 415/180 |
| 8,814,499 B2 * | 8/2014 | Kim | .................... | F04D 29/0516 415/145 |
| 8,905,707 B2 * | 12/2014 | Colson | ................. | F04D 29/057 415/104 |
| 9,062,712 B1 | 6/2015 | Bruckner | | |
| 9,638,199 B2 * | 5/2017 | Beers | .................... | F04D 25/082 |
| 2006/0061221 A1 | 3/2006 | McAuliffe et al. | | |
| 2006/0061222 A1 | 3/2006 | McAuliffe et al. | | |
| 2011/0243762 A1 * | 10/2011 | Daikoku | ............ | F04D 25/0606 417/321 |
| 2013/0101436 A1 | 4/2013 | Colson et al. | | |
| 2013/0280042 A1 * | 10/2013 | Beers | .................... | B64D 13/06 415/116 |
| 2015/0037138 A1 | 2/2015 | Beers et al. | | |
| 2015/0104302 A1 | 4/2015 | Colson et al. | | |
| 2015/0308460 A1 | 10/2015 | Lucic et al. | | |

* cited by examiner

VENTILATION FAN HAVING AIR BEARING SYSTEM

BACKGROUND

Aircraft ventilation fans are used to move conditioned air to various locations of the aircraft such as the cockpit or cabin. The aircraft ventilation fans may use ball bearings to rotatably support rotating components.

BRIEF DESCRIPTION

According to an embodiment of the present disclosure, a ventilation fan is provided. The ventilation fan includes a shaft assembly, a rotor, a motor housing, a first opening, and a bearing housing. The shaft assembly extends along an axis and is disposed within a housing assembly. The shaft assembly includes a first shaft having a first shaft first portion that defines a first port, and a first shaft second portion that defines a second port. The first shaft is operatively connected to a second shaft having a second shaft first portion that defines a third port. The second shaft further having a second shaft second portion. The rotor has a rotor first portion disposed about the first shaft first portion and a rotor second portion that extends from the rotor first portion. The rotor first portion defines a rotor port. The motor housing is disposed about the first shaft second portion. The motor housing has a housing arm, a housing leg that extends from the housing arm, a housing extension that extends from the housing leg, and a vane platform that extends from the housing extension. The first opening is defined between respective ends of the rotor second portion and the vane platform. The bearing housing is operatively connected to the motor housing. The bearing housing is disposed about the second shaft second portion. The bearing housing has a bearing arm, a bearing leg that extends from the bearing arm, and a bearing extension that extends from the bearing leg.

According to another embodiment of the present disclosure, a ventilation fan is provided. The ventilation fan includes a shaft assembly, a rotor, a motor housing, and a bearing housing. The shaft assembly includes a first shaft, a second shaft, and a third shaft. The first shaft has a first shaft first portion and a first shaft second portion. The first shaft second portion defines a first port. The first shaft is operatively connected to the second shaft. The second shaft defines a second port. The third shaft is operatively connected to the second shaft. The rotor has a rotor first portion disposed about the first shaft first portion and a rotor second portion that extends from the rotor first portion. The rotor first portion defines a rotor port. The motor housing is disposed about the first shaft second portion. The motor housing has a housing arm, a housing leg that extends from the housing arm, and a vane platform that extends from the housing extension. The vane platform defines a housing port. The bearing housing is operatively connected to the motor housing. The bearing housing is disposed about the third shaft. The bearing housing has a bearing arm and a bearing leg that extends from the bearing arm.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Aircraft may include a cockpit or cabin ventilation system. The cockpit or cabin ventilation system may be provided as part of a larger environmental control system. The environment control system is configured to receive ambient air, condition the ambient air, and provide the conditioned air to various systems such as the cockpit or cabin ventilation system.

Figure 1:
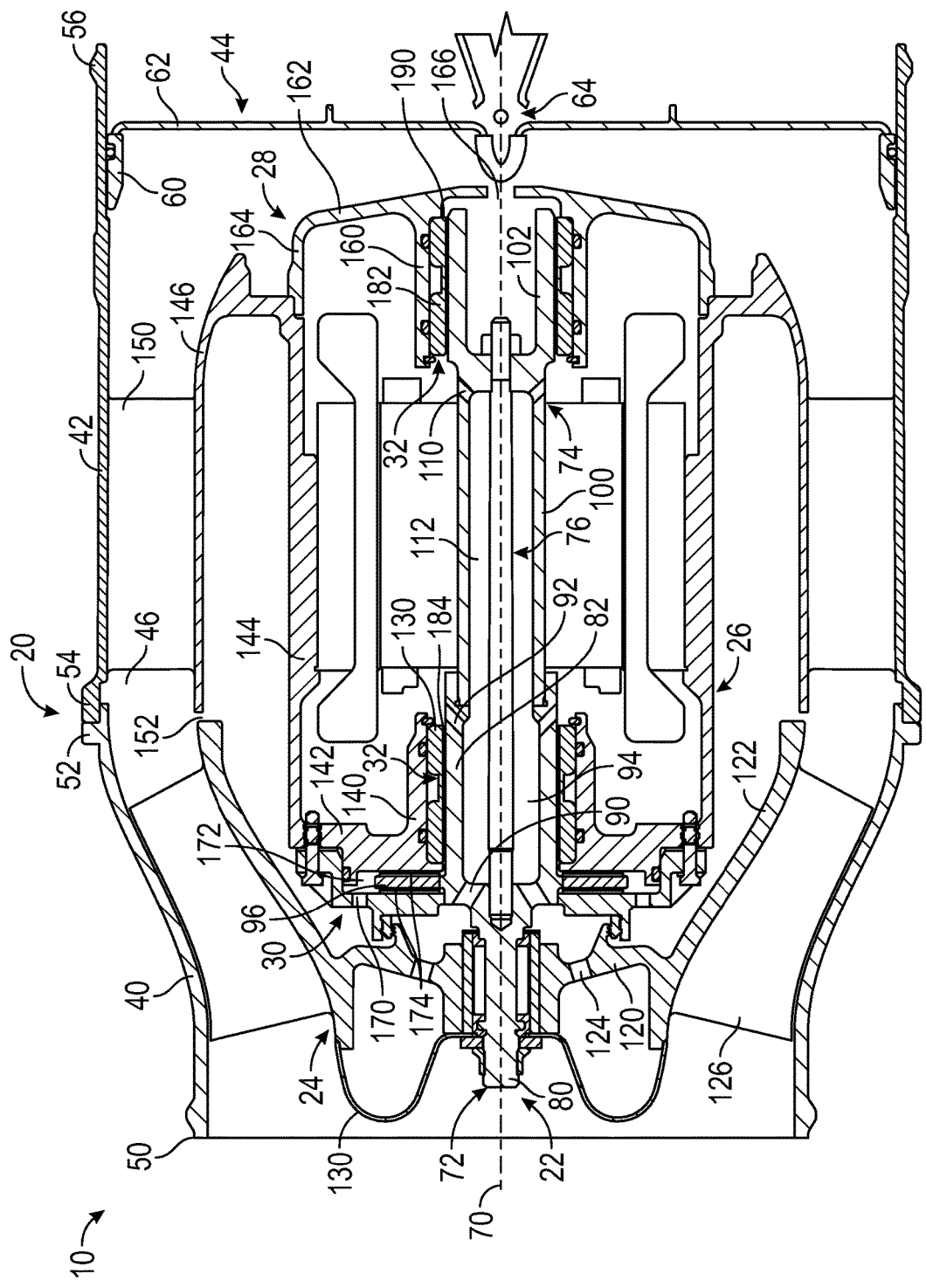
FIG. 1 is a sectional view of a first embodiment of a ventilation fan having an air bearing system.
Figure 2:
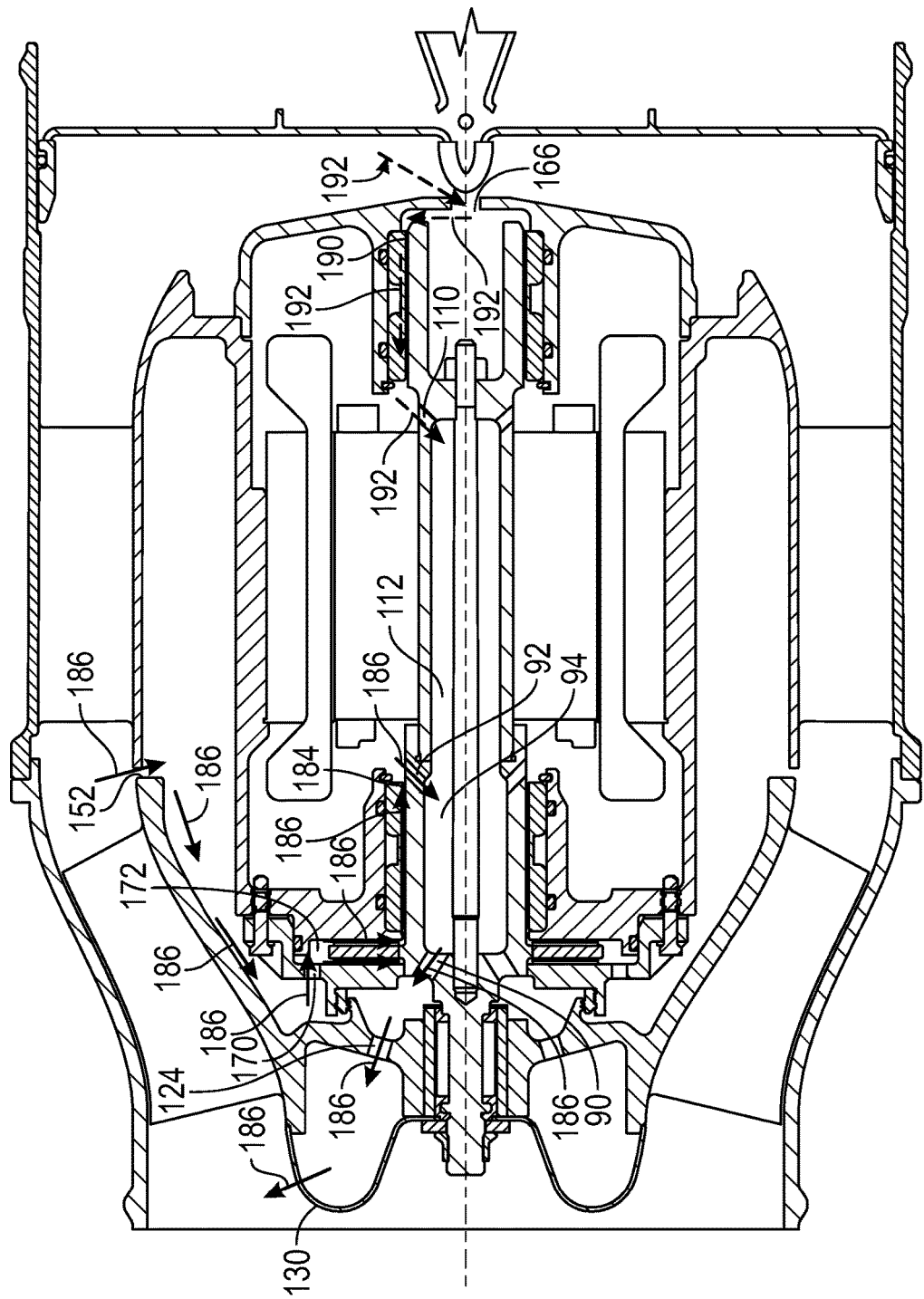
FIG. 2 is a sectional view of the first embodiment of the ventilation fan illustrating flow paths of the air bearing system.

Referring to FIGS. 1 and 2, the conditioned air may be provided to the cockpit or cabin through a ventilation fan 10. The ventilation fan 10 includes a housing assembly 20, a shaft assembly 22, a rotor 24, a motor housing 26, a bearing housing 28, a thrust plate 30, and an air bearing system 32.

The housing assembly 20 includes a first housing 40 that is operatively connected to a second housing 42 and a check valve assembly 44 that is operatively connected to the second housing 42. The first housing 40 and the second housing 42 cooperate to define a cavity 46 that may receive various components of the ventilation fan 10.

The first housing 40 defines a fan section inlet at a first end 50 of the first housing 40 and a fan section outlet at a second end 52 of the first housing 40. The first end 50 may have a first diameter and the second end 52 may have a second diameter that is greater than the first diameter.

The second housing 42 defines a rotor section inlet at a first end 54 of the second housing 42 and a rotor section outlet at a second end 56 of the second housing 42. The first end 54 may have a first diameter and the second end 56 may have a second diameter that is substantially equal to the first diameter. The first end 54 of the second housing 42 is operatively connected to the second end 52 of the first housing 40.

The check valve assembly 44 is disposed proximate the second end 56 of the second housing 42. The check valve assembly 44 includes a mounting frame 60, a valve plate 62, and a valve mechanism 64. The mounting frame 60 is disposed on an interior surface of the second housing 42. The valve plate 62 is operatively connected to the second housing 42 via the mounting frame 60. The valve plate 62 defines an opening that is configured to receive the valve mechanism 64. The valve mechanism 64 is configured as a one-way valve to inhibit backflow through the ventilation fan 10.

The shaft assembly 22 is disposed within the cavity 46 of the housing assembly 20. The shaft assembly 22 extends along an axis 70. The opening of the valve plate 62 is disposed about the axis 70. The shaft assembly 22 includes a first shaft 72, a second shaft 74, and a tie rod 76. In at least one embodiment, the shaft assembly 22 is configured as a one-piece shaft.

The first shaft 72 is disposed within the first housing 40 and extends axially along the axis 70. The first shaft 72 extends at least partially into the second housing 42. The first shaft 72 includes a first shaft first portion 80 and a first shaft second portion 82 that extends from the first shaft first portion 80. The first shaft first portion 80 is disposed proximate the first end 50 of the first housing 40. The first shaft first portion 80 defines a first port 90. In at least one embodiment, the first port 90 is defined within a region that extends between the first shaft first portion 80 and the first shaft second portion 82. The first shaft second portion 82 extends towards the second end 52 of the first housing 40 along the axis 70. The first shaft second portion 82 defines a second port 92, a first cavity 94, and a thrust runner 96. The first port 90 and the second port 92 extend into the first cavity 94. The thrust runner 96 extends radially away from the axis 70 and the first shaft second portion 82.

The second shaft 74 is operatively connected to the first shaft 72. The second shaft 74 is disposed within the second housing 42 and extends axially along the axis 70. The second shaft 74 includes a second shaft first portion 100 and a second shaft second portion 102. The second shaft first portion 100 is disposed proximate the first end 54 of the second housing 42. The second shaft first portion 100 is operatively connected to the first shaft second portion 82. The second shaft first portion 100 defines a third port 110 and a second cavity 112. The third port 110 extends into the second cavity 112. The second shaft second portion 102 extends towards the second end 56 of the second housing 42 along the axis 70.

The tie rod 76 is operatively connected to the first shaft 72 and the second shaft 74. The tie rod 76 is operatively connected to the first shaft first portion 80 and the second shaft second portion 102. The tie rod 76 is disposed within and extends through the first cavity 94 and the second cavity 112.

The rotor 24 is disposed within the first housing 40. The rotor 24 is rotatably connected to the shaft assembly 22 to define a rotative assembly. The rotor 24 includes a rotor first portion 120 and a rotor second portion 122. The rotor first portion 120 is disposed about the first shaft first portion 80. The rotor first portion 120 defines a rotor port 124 that extends completely through the rotor first portion 120. The rotor second portion 122 extends from the rotor first portion 120 towards the second end 52 of the first housing 40. The rotor second portion 122 includes a fan blade 126. The fan blade 126 extends towards an inner surface of the first housing 40.

In at least one embodiment, the rotor 24 includes a shroud 130. The shroud 130 is operatively connected to the rotor first portion 120 and the first shaft first portion 80. The shroud 130 defines at least one opening.

The motor housing 26 is disposed within the cavity 46 and extends between the first housing 40 and the second housing 42 of the housing assembly 20. The motor housing 26 is configured to receive a motor that is configured to drive the rotor 24 to rotate the fan blade 126. The motor housing 26 is spaced apart from the rotor 24.

The motor housing 26 includes a housing arm 140, a housing leg 142, a housing extension 144, and a vane platform 146. The housing arm 140 is disposed about the first shaft second portion 82. The housing arm 140 is disposed substantially parallel to the axis 70. The housing leg 142 extends from the housing arm 140. The housing leg 142 is disposed substantially perpendicular to the axis 70. The housing extension 144 extends from the housing leg 142. The housing extension 144 is disposed substantially parallel to the axis 70 and is disposed substantially parallel to the housing arm 140. The housing extension 144 is radially spaced apart from the housing arm 140. The vane platform 146 extends from the housing extension 144. At least a portion of the vane platform 146 is disposed substantially parallel to the axis 70 and is disposed substantially parallel to the housing extension 144 and the housing arm 140.

The vane platform 146 includes a stator or a vane 150 that extends between the vane platform 146 and an inner surface of the second housing 42. A first opening 152 is defined between respective ends of the rotor second portion 122 and the vane platform 146.

The bearing housing 28 is operatively connected to the motor housing 26. The bearing housing 28 includes a bearing arm 160, a bearing leg 162, and a bearing extension 164. The bearing arm 160 is disposed about the second shaft second portion 102. The bearing arm 160 is disposed substantially parallel to the axis 70. The bearing leg 162 extends from the bearing arm 160. The bearing leg 162 is disposed substantially perpendicular to the axis 70 and the bearing arm 160. At least a portion of the bearing leg 162 extends towards the axis 70. The bearing leg 162 of the bearing housing 28 defines a second opening 166. The bearing extension 164 extends from the bearing leg 162 towards the motor housing 26. The bearing extension 164 is operatively connected to at least one of the housing extension 144 and the vane platform 146. The bearing extension 164 is disposed substantially parallel to the axis 70.

The thrust plate 30 is positioned axially between the rotor 24 and the motor housing 26. More specifically, the thrust plate 30 is positioned axially between the rotor first portion 120 and the housing leg 142. The thrust plate 30 is positioned radially between the shaft assembly 22 and the rotor 24. More specifically, the thrust plate is positioned radially between the first shaft second portion 82 and the rotor second portion 122. The thrust plate 30 defines a thrust port 170 that extends into a third cavity 172 that is defined between the thrust plate 30 and the housing leg 142 of the motor housing 26.

The thrust runner 96 is at least partially received within the third cavity 172. The thrust runner 96 is positioned axially between the thrust plate 30 and the housing leg 142 of the motor housing 26. In at least one embodiment, a thrust air bearing 174 is disposed within the third cavity 172. The thrust air bearing 174 is disposed between the thrust runner 96 and at least one of the thrust plate 30 and the housing leg 142 of the motor housing 26.

The air bearing system 32 includes a first journal air bearing 180 and a second journal air bearing 182. The first journal air bearing 180 and the second journal air bearing 182 may be configured as thin-film hydrodynamic foil bearings that rotatably support rotating components of the ventilation fan 10 such as the shaft assembly 22.

The first journal air bearing 180 is disposed about the first shaft second portion 82. The first journal air bearing 180 is positioned radially between the housing arm 140 and the first shaft second portion 82. The first journal air bearing 180 is positioned axially between the first port 90 and the second port 92. An inner surface of the first journal air bearing 180 and an outer surface of the first shaft second portion 82 define a first journal air bearing flow path 184.

The first opening 152 is in fluid communication with the thrust port 170, the third cavity 172, the first journal air bearing flow path 184, the second port 92, the first cavity 94, the first port 90, and the rotor port 124 to define a first flow path 186. The first flow path 186 is illustrated by the solid block arrows shown in FIG. 2. Airflow that flows through the first flow path 186 is exhausted through an opening of the shroud 130.

The second journal air bearing 182 is disposed about the second shaft second portion 102. The second journal air bearing 182 is positioned radially between bearing arm 160 and the second shaft second portion 102. The second journal air bearing 182 is positioned axially between the third port 110 and an end of the second shaft second portion 102. An inner surface of the second journal air bearing 182 and an outer surface of the second shaft second portion 102 define a second journal air bearing flow path 190.

The second opening 166 is in fluid communication with the second journal air bearing flow path 190, the third port 110, the second cavity 112, the first port 90, and the rotor port 124 to define a second flow path 192. The second flow path 192 is illustrated by the dashed block arrows shown in FIG. 2. Airflow that flows through the second flow path 192 is exhausted through the opening of the shroud 130.

Figure 3:
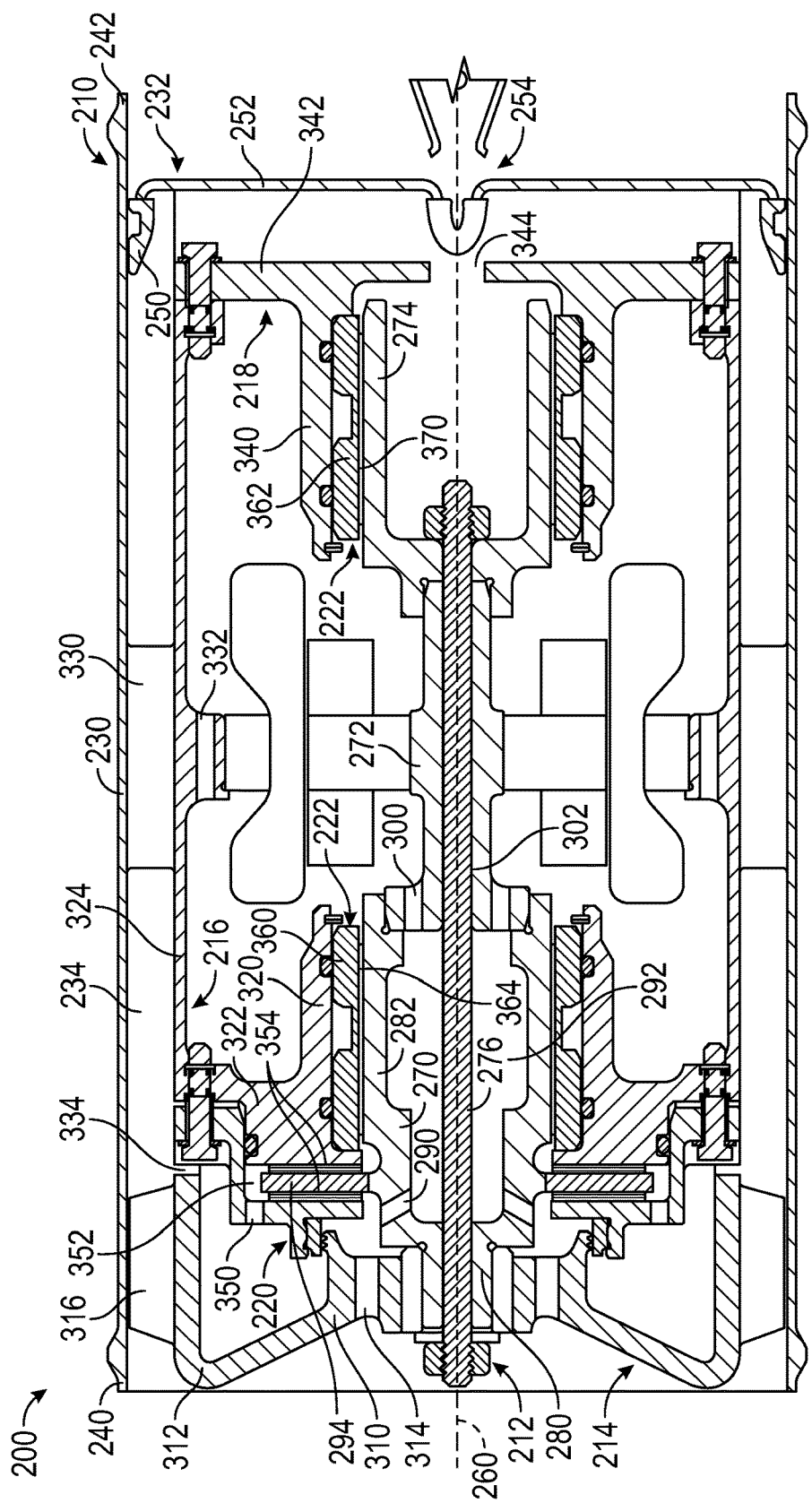
FIG. 3 is a sectional view of a second embodiment of a ventilation fan having an air bearing system.
Figure 4:
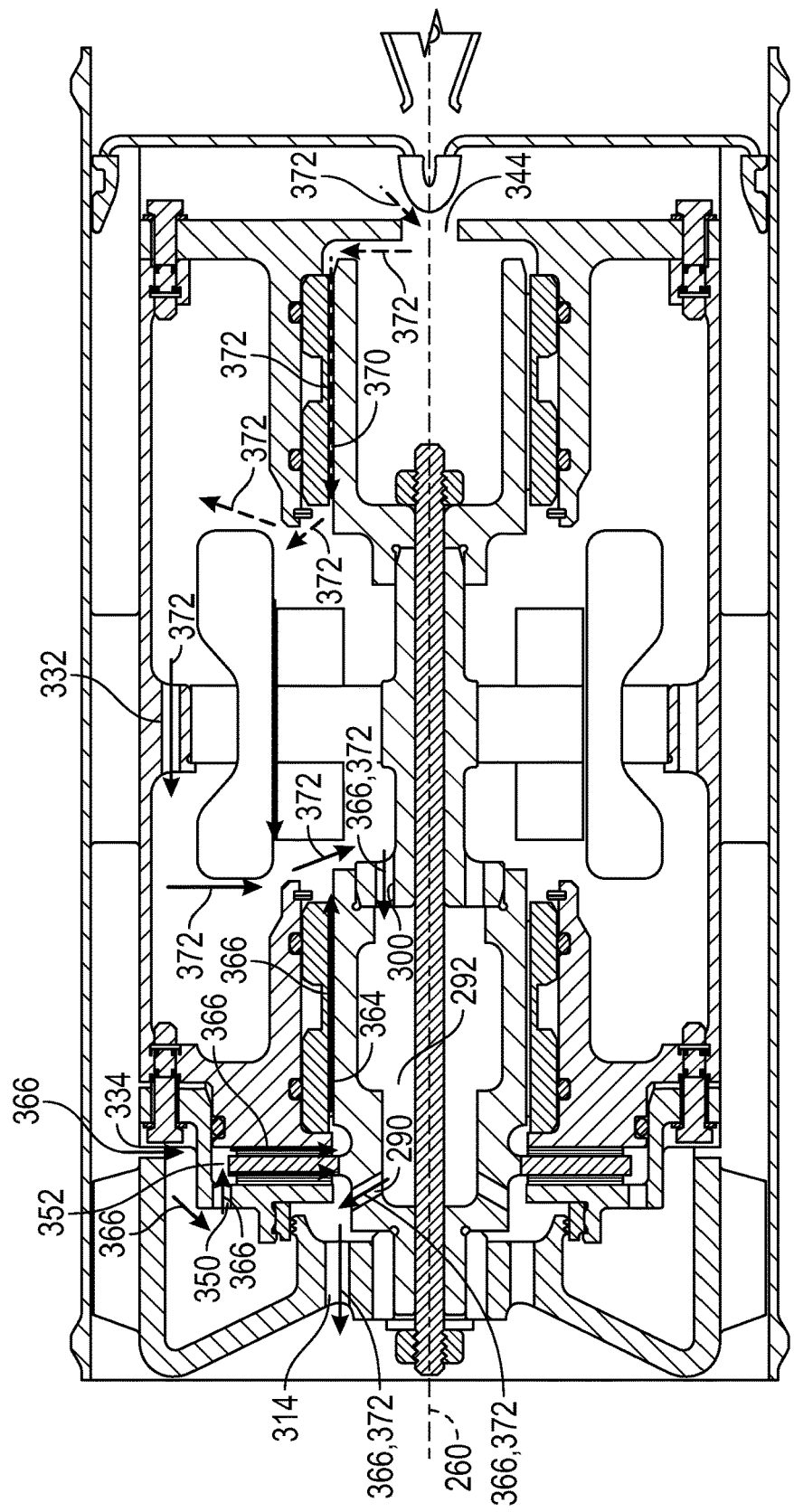
FIG. 4 is a sectional view of the second embodiment of the ventilation fan illustrating flow paths of the air bearing system.

Referring to FIGS. 3 and 4, a second embodiment of a ventilation fan 200 is illustrated. The ventilation fan 200 includes a housing assembly 210, a shaft assembly 212, a rotor 214, a motor housing 216, a bearing housing 218, a thrust plate 220, and an air bearing system 222.

The housing assembly 210 includes a housing body 230 and a check valve assembly 232 that is operatively connected to the housing body 230. The housing body 230 defines a cavity 234 that may receive various components of the ventilation fan 200.

The housing body 230 defines a fan section inlet at a first end 240 of the housing body 230 and a fan section outlet at a second end 242 of the housing body 230. The first end 240 may have a first diameter and the second end 242 may have a second diameter that is substantially equal to the first diameter.

The check valve assembly 232 is disposed proximate the second end 242 of the housing body 230. The check valve assembly 232 includes a mounting frame 250, a valve plate 252, and a valve mechanism 254. The mounting frame 250 is disposed on an interior surface of the housing body 230. The valve plate 252 is operatively connected to the housing body 230 via the mounting frame 250. The valve plate 252 defines an opening that is configured to receive the valve mechanism 254. The valve mechanism 254 is configured as a one-way valve to inhibit backflow through the ventilation fan 200.

The shaft assembly 212 is disposed within the cavity 234 of the housing assembly 210. The shaft assembly 212 extends along an axis 260. The opening of the valve plate 252 is disposed about the axis 260. The shaft assembly 212 includes a first shaft 270, a second shaft 272, a third shaft 274, and a tie rod 276. In at least one embodiment, the shaft assembly 212 is configured as a one-piece shaft.

The first shaft 270 extends axially along the axis 260. The first shaft 270 includes a first shaft first portion 280 and a first shaft second portion 282 that extends from the first shaft first portion 280. The first shaft first portion 280 is disposed proximate the first end 240 of the housing body 230. The first shaft second portion 282 extends towards the second end 242 of the housing body 230 along the axis 260. The first shaft second portion 282 defines a first port 290, a first cavity 292, and a thrust runner 294. The first port 290 extends into the first cavity 292. The thrust runner 294 extends radially away from the axis 260 and the first shaft second portion 282.

The second shaft 272 is operatively connected to the first shaft 270. An end of the second shaft 272 is received within an end of the first shaft 270. The second shaft 272 extends along the axis 260. The second shaft 272 defines a second port 300 and a second cavity 302. The second port 300 is disposed proximate an end of the first shaft 270. The second port 300 extends into the second cavity 302.

The third shaft 274 is operatively connected to the second shaft 272. The third shaft 274 extends along the axis 260. An end of the third shaft 274 is disposed about an end of the second shaft 272.

The tie rod 276 is operatively connected to the first shaft 270, the second shaft 272, and the third shaft 274. The tie rod 276 is operatively connected to the first shaft first portion 280 and the third shaft 274. The tie rod 276 is disposed within and extends through the first cavity 292 and the second cavity 302.

The rotor 214 is disposed within the cavity 234 of the housing body 230. The rotor 214 is rotatably connected to the shaft assembly 212 to define a rotative assembly. The rotor 214 includes a rotor first portion 310 and a rotor second portion 312. The rotor first portion 310 is disposed about the first shaft first portion 280. The rotor first portion 310 defines a rotor port 314 that extends completely through the rotor first portion 310. The rotor second portion 312 extends from the rotor first portion 310 towards an inner surface of the housing body 230. The rotor second portion 312 includes a fan blade 316. The fan blade 316 extends towards the inner surface of the housing body 230.

The motor housing 216 is disposed within the cavity 234 of the housing assembly 20. The motor housing 216 is configured to receive a motor that is configured to drive the rotor 214 to rotate the fan blade 316. The motor housing 216 is spaced apart from the rotor 214.

The motor housing 216 includes a housing arm 320, a housing leg 322, and a vane platform 324. The housing arm 320 is disposed about the first shaft second portion 282. The housing arm 320 is disposed substantially parallel to the axis 260. The housing leg 322 extends from the housing arm 320. The housing leg 322 is disposed substantially perpendicular to the axis 260. The vane platform 324 extends from the housing leg 322. At least a portion of the vane platform 324 is disposed substantially parallel to the axis 260 and is disposed substantially parallel to the housing arm 320.

The vane platform 324 includes a stator or a vane 330 that extends between the vane platform 324 and an inner surface of the housing body 230. A housing port 332 is defined by the vane platform 324. The housing port 332 is defined by a portion of the vane platform 324 that extends towards the motor and the axis 260. A first opening 334 is defined between respective ends of the rotor second portion 312 and at least one of the housing leg 322 and the vane platform 324.

The bearing housing 218 is operatively connected to the motor housing 216. The bearing housing 218 includes a bearing arm 340 and a bearing leg 342. The bearing arm 340 is disposed about the third shaft 274. The bearing arm 340 is disposed substantially parallel to the axis 260. The bearing leg 342 extends from the bearing arm 340. The bearing leg 342 is disposed substantially perpendicular to the axis 260 and the bearing arm 340. At least a portion of the bearing leg 342 extends towards the axis 260. The bearing leg 342 of the bearing housing 218 defines a second opening 344. The bearing leg 342 is operatively connected to the vane platform 324.

The thrust plate 220 is positioned axially between the rotor 214 and the motor housing 216. More specifically, the thrust plate 220 is positioned axially between the rotor second portion 312 and the housing leg 322. The thrust plate 220 is positioned radially between the shaft assembly 212 and housing body 230. The thrust plate 220 defines a thrust port 350 that extends into a third cavity 352 that is defined between the thrust plate 220 and the housing leg 322 of the motor housing 216. In at least one embodiment, the first opening 334 is defined between respective ends of the rotor second portion 312 and the thrust plate 220.

The thrust runner 294 is at least partially received within the third cavity 352. The thrust runner 294 is positioned axially between the thrust plate 220 and the housing leg 322 of the motor housing 216. In at least one embodiment, a thrust air bearing 354 is disposed within the third cavity 352. The thrust air bearing 354 is disposed between the thrust runner 294 and at least one of the thrust plate 220 and the housing leg 322 of the motor housing 216.

The air bearing system 222 includes a first journal air bearing 360 and a second journal air bearing 362. The first journal air bearing 360 and the second journal air bearing 362 may be configured as thin-film hydrodynamic foil bearings that are configured to rotatably support rotating components of the ventilation fan 200 such as the shaft assembly 212.

The first journal air bearing 360 is disposed about the first shaft second portion 282. The first journal air bearing 360 is positioned radially between the bearing arm 340 and the first shaft second portion 282. The first journal air bearing 360 is positioned axially between the first port 290 and the second port 300. An inner surface of the first journal air bearing 360 and an outer surface of the first shaft second portion 282 define a first journal air bearing flow path 364.

The first opening 334 is in fluid communication with the thrust port 350, the third cavity 352, the first journal air bearing flow path 364, the second port 300, the first cavity 292, the first port 290, and the rotor port 314 to define a first flow path 366. The first flow path 366 is illustrated by the solid block arrows shown in FIG. 4.

The second journal air bearing 362 is disposed about the third shaft 274. The second journal air bearing 362 is positioned radially between bearing arm 340 and the third shaft 274. The second journal air bearing 362 is positioned axially between an end of the second shaft 272 and the bearing leg 342. An inner surface of the second journal air bearing 362 and an outer surface of the third shaft 274 define a second journal air bearing flow path 370.

The second opening 344 is in fluid communication with the second journal air bearing flow path 370, the housing port 332, the second port 300, the first cavity 292, the first port 290, and the rotor port 314 to define a second flow path 372. The second flow path 372 is illustrated by the dashed block arrows shown in FIG. 4.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description, but is only limited by the scope of the appended claims.

The invention claimed is:

1. A ventilation fan, comprising:
   a shaft assembly extending along an axis and disposed within a housing assembly, the shaft assembly including:
      a first shaft having: a first shaft first portion, defining a first port, and
         a first shaft second portion, defining a second port,
      a second shaft operatively connected to the first shaft, the second shaft having:
         a second shaft first portion, defining a third port, and
         a second shaft second portion;
   a rotor having:
      a rotor first portion disposed about the first shaft first portion and,
      a rotor second portion extending from the rotor first portion, the rotor first portion defining a rotor port;
   a motor housing disposed about the first shaft second portion, the motor housing having:
      a housing arm,
      a housing leg extending from the housing arm,
      a housing extension extending from the housing leg, and
      a vane platform extending from the housing extension;
   a first opening defined between an end of the rotor second portion and the vane platform; and
   a bearing housing operatively connected to the motor housing and disposed about the second shaft second portion, the bearing housing having:
      a bearing arm,
      a bearing leg extending from the bearing arm, wherein, relative to an axis of rotation for the ventilation fan, the bearing leg is axially aft of the shaft second portion and extends radially inward to define a second opening having a diameter that is smaller than the second shaft second portion, and
      a bearing extension extending from the bearing leg;
   a housing cavity defined by the housing assembly, wherein the shaft assembly, the rotor, the motor housing, and the bearing housing are disposed radially within the housing cavity; and
   a check valve assembly that includes:
      a mounting frame disposed on an interior surface of an axial aft end of the housing assembly, and
      a valve plate connected to the mounting frame so that the valve plate is axially aft of the bearing arm, the valve plate defining:
         an axially aft surface for the housing cavity; and
         an opening that is configured to receive a valve to inhibit backflow through the ventilation fan.

2. The ventilation fan of claim 1, further comprising:
a first journal air bearing that rotatably supports the shaft assembly, the first journal air bearing being positioned radially between the housing arm and the first shaft second portion and positioned axially between the first port and the second port.

3. The ventilation fan of claim 2, wherein an inner surface of the first journal air bearing and an outer surface of the first shaft second portion define a first journal air bearing flow path.

4. The ventilation fan of claim 3, further comprising:
a thrust plate positioned radially between the first shaft second portion and the rotor second portion and positioned axially between the rotor first portion and the housing leg;
a thrust runner positioned axially between the thrust plate and the housing leg; and
a thrust air bearing disposed between the thrust runner and at least one of the thrust plate and the housing leg.

5. The ventilation fan of claim 4, wherein the first shaft second portion defines the thrust runner positioned axially between the thrust plate and the housing leg.

6. The ventilation fan of claim 5, wherein the thrust plate defines a thrust port.

7. The ventilation fan of claim 6, wherein the first opening is in fluid communication with the thrust port, the first journal air bearing flow path, the second port, the first port, and the rotor port to define a first flow path.

8. The ventilation fan of claim 2, further comprising:
a second journal air bearing positioned radially between the bearing arm and the second shaft second portion.

9. The ventilation fan of claim 8, wherein an inner surface of the second journal air bearing and an outer surface of the second shaft second portion define a second journal air bearing flow path.

10. The ventilation fan of claim 9, wherein the second opening is in fluid communication with the second journal air bearing flow path and the third port to define a second flow path.

* * * * *